United States Patent [19]

Mura

[11] 4,439,721
[45] Mar. 27, 1984

[54] MAGNETO ALTERNATOR REGULATOR WITH TACHOMETER OUTPUT

[75] Inventor: Richard J. Mura, Kenosha, Wis.

[73] Assignee: Outboard Marine Corporation, Waukegan, Ill.

[21] Appl. No.: 348,222

[22] Filed: Feb. 12, 1982

[51] Int. Cl.³ .......................... H02P 9/00; G02P 3/56
[52] U.S. Cl. ........................................ 322/31; 320/61; 322/89; 324/161; 324/174
[58] Field of Search .................. 322/89, 90, 91, 94, 322/29, 31; 320/39, 40, 59, DIG. 1, DIG. 2, 61; 324/161, 174

[56] References Cited

U.S. PATENT DOCUMENTS

| | | | |
|---|---|---|---|
| 3,314,007 | 4/1967 | Johnson | 322/29 X |
| 3,389,324 | 9/1968 | Ballman | 320/40 X |
| 3,530,366 | 9/1970 | Schwarm | 322/91 X |
| 3,930,197 | 12/1975 | Saylor | 320/25 X |
| 4,207,515 | 6/1980 | Yukawa | 322/28 X |

Primary Examiner—R. J. Hickey
Attorney, Agent, or Firm—Michael, Best & Friedrich

[57] ABSTRACT

Disclosed herein is a magneto regulator circuit for regulating charging of the battery by the output of a magneto alternator. The regulator circuit includes a first circuit operative for connecting and disconnecting the battery in series with the alternator to allow or prevent charging of the battery. The first circuit includes a thyristor having a gate and operative when a trigger signal is applied to the gate for connecting the battery in series with the alternator to allow charging of the battery, a trigger switch which can be rendered conductive, subject to the battery voltage, for applying the trigger signal to the gate, and a shut-off switch for rendering the trigger switch conductive. The regulator circuit also includes a battery voltage sensing circuit coupled to the first circuit for selectively rendering the first circuit operative to disconnect the battery from being connected in series with the alternator to prevent charging of the battery, the voltage sensing means comprising a by-pass switch operative when the battery voltage exceeds an upper charging limit, for rendering the trigger switch means non-conductive to prevent application of the trigger signal to the gate of the thyristor. The regulator circuit also preferably includes a tachometer output circuit coupled to the magneto alternator and to the first circuit for providing a tachometer output having a voltage with a magnitude substantially the same as the magnitude of the battery voltage.

12 Claims, 1 Drawing Figure

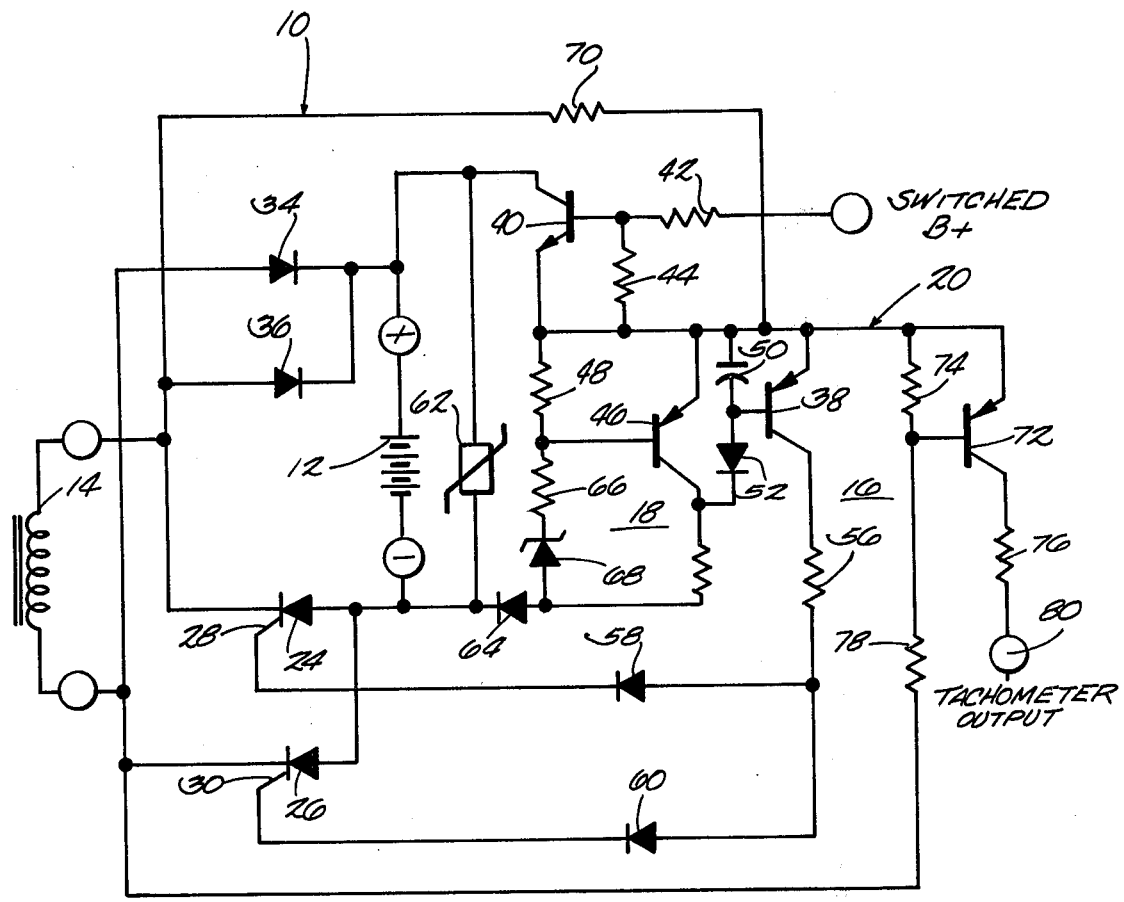

MAGNETO ALTERNATOR REGULATOR WITH TACHOMETER OUTPUT

BACKGROUND OF THE INVENTION

The invention relates generally to regulators for controlling charging of a battery, and more particularly, relates to a magneto alternator regulator including a tachometer output. Attention is directed to the following United States Patents which disclose regulators for controlling charging of a battery.

| | | |
|---|---|---|
| Gordon | 4,031,451 | June 21, 1977 |
| Harris | 3,670,229 | June 13, 1972 |
| Henrich | 3,697,850 | Oct. 10, 1972 |
| Gahler | 4,081,739 | March 28, 1978 |
| Harris | 3,936,723 | Feb. 3, 1976 |
| Bourke | 3,938,020 | Feb. 10, 1976 |
| Van Opijnen | 3,857,082 | Dec. 24, 1974 |
| Ackermann | 3,748,568 | July 24, 1973 |
| Rowas | 3,969,665 | July 13, 1976 |
| Ruben | 3,766,463 | Oct. 16, 1973 |
| Walsh | 3,305,755 | Feb. 21, 1967 |
| Wright | 3,315,141 | May 14, 1964 |
| Walsh | 3,321,692 | May 23, 1967 |
| Bertioli | 3,586,956 | March 10, 1969 |
| Ballman | 3,733,535 | May 15, 1973 |
| Charboneau | 3,781,632 | Dec. 25, 1973 |
| Gruwicz | 4,281,279 | July 28, 1981 |
| Farr | 4,146,831 | March 27, 1979 |

SUMMARY OF THE INVENTION

The invention disclosed herein provides a magneto alternator regulator circuit for regulating charging of a battery by the output of the magneto alternator. The regulator circuit includes first circuit means operative for connecting and disconnecting the battery in series with the alternator to allow or prevent charging of the battery, battery voltage sensing means coupled to the first circuit means for selectively rendering the first circuit means operative to disconnect the battery from being connected in series with the alternator to prevent charging of the battery, and tachometer output circuit means coupled to the magneto alternator and to the first circuit means for providing a tachometer output having a voltage with a magnitude substantially the same as the magnitude of the battery voltage.

In accordance with an embodiment of the invention the first circuit means comprises rectifier means including thyristor switch means having a gate and operative when a trigger signal is applied to the gate for connecting the battery in series with the alternator to allow charging of the battery, trigger switch means which can be rendered conductive, subject to the battery voltage sensing means, for applying the trigger signal to the gate, and shut-off switch means for rendering said trigger switch means conductive.

In accordance with an embodiment of the invention the tachometer output circuit means comprises a high impedance device and transistor switch means connected to the battery through the shut-off means and connected to the alternator through the high impedance device, for operating as an over-driven amplifier to provide a square wave output having a voltage magnitude substantially the same as the magnitude of the battery voltage. The battery voltage sensing means preferably comprises by-pass switch means, operative when the battery voltage exceeds an upper charging limit, for rendering the trigger switch means non-conductive to prevent application of the trigger signal to the gate of the thyristor switch means.

Also in accordance with an embodiment of the invention the rectifier means further comprises two diodes and the thyristor switch means comprises two thyristors each having a gate, the diodes and thyristors being connected to the alternator and the battery to allow full wave charging of the battery by the alternator when trigger signals are applied to each of the thyristor gates. The trigger switch means is conductive, subject to the voltage sensing means, for applying trigger signals to each of the thyristor gates to allow the full wave charging of the battery.

Also in accordance with an embodiment of the invention the voltage sensing means further comprises threshold voltage means coupled to the positive and negative terminals of the battery, the voltage threshold means being rendered conductive when the battery voltage exceeds the upper charging limit. The by-pass switch means preferably comprises a by-pass transistor rendered conductive when the voltage threshold means is rendered conductive, the by-pass transistor when rendered conductive, rendering the trigger switch means non-conductive.

Also in accordance with an embodiment of the invention the magneto regulator further comprises voltage clamping means coupled across positive and negative terminals of the battery to prevent the battery voltage or alternator voltage applied to the regulator circuit from exceeding an excess voltage limit. A diode is preferably connected in circuit with the battery and the voltage threshold means to prevent damage to the regulator circuit as a result of an operator connecting the battery in reverse polarity.

The invention disclosed herein also provides a magneto regulator circuit for regulating charging of battery by the output of a magneto alternator. The regulator circuit comprises first circuit means operative for connecting and disconnecting the battery in series with the alternator to allow or prevent charging of the battery, the first circuit means including rectifier means including thyristor switch means having a gate and operative when a trigger signal is applied to the gate for connecting the battery in series with the alternator to allow charging of the battery, trigger switch means which can be rendered conductive, subject to the battery voltage, for applying the trigger signal to the gate, and shut-off switch means, operative for rendering the trigger switch means conductive, and battery voltage sensing means coupled to the first circuit means for selectively rendering the first circuit means operative to disconnect the battery from being connected in series with the alternator to prevent charging of the battery, the voltage sensing means comprising by-pass switch means, operative when the battery voltage exceeds an upper charging limit, for rendering the trigger switch means non-conductive to prevent application of the trigger signal to the gate of the thyristor switch means.

One of the principle features of the invention is the provision of a magneto regulator circuit which effectively charges a battery and prevents power from being wasted when the battery is charged.

Another of the principle features of the invention is the provision of such a magneto alternator regulator including a tachometer signal output with a voltage having a magnitude limited to substantially the same magnitude as the battery voltage to prevent damage to the tachometer circuitry. The tachometer signal is available whether the battery is being charged or not.

Another of the principle features of the invention is the provision of such a magneto alternator regulator which includes circuitry clamping incoming voltage and for dissapating incoming energy when the battery is accidentally removed during a charging cycle.

Other features and advantages of the embodiments of the invention will become known by reference to the following drawing, general description and claims.

DRAWINGS

The sole FIGURE is a schematic diagram illustrating a magneto alternator circuit which embodies various of the features of the invention.

Before explaining the embodiments of the invention in detail, it is to be understood that the invention is not limited in its application to the details of construction and arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the FIGURE is a magneto alternator regulator circuit 10 for regulating charging of a battery 12 by the output of a magneto alternator 14. The regulator circuit 10 includes first circuit means, generally designated 16, operative for connecting and disconnecting the battery 12 is series with the alternator 14 to allow or prevent charging of the battery, and battery voltage sensing means, generally designated 18, coupled to the first circuit means and operative to disconnect the battery from a series connection with the alternator 14 to prevent charging of the battery. In its preferred form, the regulator circuit 10 also includes a tachometer output circuit, generally designated 20, for providing a tachometer output having a voltage with a magnitude substantially the same as the magnitude of the battery voltage.

As shown in the FIGURE, the first circuit means 16 includes rectifier means, preferably made up of two thyristors or SCRs 24 and 26, having gates 28 and 30 respectively, the rectifier means also including two diodes 34 and 36. The diodes and SCRs are connected as shown to the alternator 14 and battery 12 to allow full wave charging of the battery by the alternator when trigger signals are applied to each of the thyristor gates.

The first circuit means 16 also includes trigger switch means, preferably in the form of a pnp transistor 38, which can be rendered conductive, subject to the battery voltage sensing means 18, for applying trigger signals to the SCR gates. The first circuit means 16 also includes shut-off switch means, preferably in the form of an npn transistor 40, which has a base connected through a current limiting resistor 42 to the positive terminal of the battery, for example, when an ignition switch (not shown) is turned to the on position. A resistor 44 is connected across the base and emitter of transistor 40 as shown.

The battery voltage sensing means 18 includes bypass switch means, preferably in the form of a pnp transistor 46 connected in circuit, as shown, with resistors 48 and 66, and voltage threshold means, preferably in the form of a zener diode 68. Zener diode 68 breaks down so that bypass transistor 46 is rendered conductive when the battery voltage exceeds an upper charging limit, for example, 14.5 volts. When the bypass transistor 46 is rendered conductive the trigger transistor 38 is rendered non-conductive, thus preventing application of trigger signals to the thyristor gates to open circuit the alternator charging circuit. Capacitor 50 and diode 52 are connected across the emitter and collector of bypass transistor 46, with their junction connected to the base of trigger transistor 38, to provide a sufficiently stable threshold for bypass transistor 46 turning off trigger transistor 38. A resistor 56 and diodes 58 and 60 are connected as shown to provide a path for the trigger signals provided from trigger transistor 38 to the gates of SCRs 24 and 26.

Voltage clamping means, preferably in the form of a varistor 62, is also provided and coupled across the positive and negative terminals of the battery 12 to prevent the battery voltage or alternator voltage applied to the regulator circuit from exceeding an excess voltage limit, as will be described in more detail below. A diode 64 connected between the negative terminal of the battery and the anode of zener diode 68 is provided to prevent damage to the regulator circuit should an operator connect the battery in reverse polarity.

The tachometer output circuit 20 includes a high impedance device, preferably a resistor 70, coupled between one end of the alternator and the emitter of a transistor switch 72, which operates as an overdriven amplifier to provide a square wave output having a voltage magnitude substantially the same as the magnitude of the battery voltage. Bias resistor 74 is connected across the emitter and base of transistor 72 and resistor 76 is connected between the collector of transistor 72 and the tachometer output 80 which is connected to tachometer circuitry (not shown). Resistor 78 is connected between resistor 74 and the other end of the alternator as shown.

A further explanation of the components which make up the regulator circuit 10 will be given in connection with the following description of operation of the regulator circuit.

Assuming the battery voltage is below the upper charging voltage, for example 14.5 volts, and that the engine is stopped so that there is no output from the alternator 14, the regulator circuit 10 begins to operate when the ignition switch (not shown) is turned on. This connects the shut off transistor 40 to the positive terminal of the battery. Since the collector of transistor 40 is connected to the positive terminal of the battery, when the base of transistor 40 is connected through current limiting resistor 42 to the positive terminal of the battery, transistor 40 switches on. It is assumed that the breakdown voltage of Zener diode 68 along with other voltage drops (Collector to emitter voltage of transistor 40, emitter to base voltage of transistor 46, and voltage across resistor 48 and diode 64) is not exceeded by the battery voltage so that bypass transistor 46 remains off. On the other hand, the emitter of trigger transistor 38 is connected to battery voltage while the diode 52 connected to the base is at ground, therefore causing trigger transistor 38 to turn on so that the battery voltage is supplied through resistor 56 and through diodes 58 and 60 to provide signals to gate 24 and 26 when the engine turns over and the alternator produces current.

Assuming a positive voltage is applied from the alternator to the anode of diode 36 the alternator voltage and current will be applied across the battery through the path made up of diode 36, the battery 12 and SCR 26 to the other end of the alternator. When the polarity of the voltage produced by the alternator coil reverses, diode 34 will be forward biased and again apply a voltage so a charging current flows through the battery by a path made up of diode 34, the battery 12, and SCR 24 to the other end of the alternator. The trigger transistor 38 will remain on providing the gate signals to the SCRs, allowing them to be rendered conductive by the alternator voltage, so long as the ignition switch remains on, turning on shut-off transistor 40, until the battery has reached a state of full charge.

For example, when the battery voltage reaches a level of 14.5 volts, dictated by the Zener diode 68, plus the voltage drops across transistor 40 and resistors 48 and 66 and diode 64, bypass transistor 46 will be biased on thereby removing base drive from transistor 38 causing it to turn off and cease triggering the SCRs until the battery voltage again drops below the specified voltage. When the SCRs stop conducting, except for the tachometer output drive, which will be discussed below, current ceases to flow in the alternator thereby causing the alternator to dissipate less energy.

Turning to the tachometer output circuit 20, as noted, the tachometer output circuitry includes the high impedance resistor 70, resistor 74, transistor 72, resistor 76 and resistor 78. When the alternator has an output of proper polarity, in this case positive, current flows through resistor 70 and 74, thereby turning on transistor 72 which functions as an overdriven amplifier to provide a square wave output, at the battery voltage, to drive the tachometer circuitry (not shown). The battery voltage is applied to the tachometer output through transistors 40 and 72 and resistor 76. The tachometer output is independent of the magnitude of the alternator output, except for the alternator voltage being required to turn on transistor 72, to provide a square wave output which has a magnitude substantially the same as the magnitude of the battery voltage.

In a fault condition when an SCR is conducting and the battery circuit is opened, current flow through the battery ceases and the alternator voltage rises until it is clamped by the varistor 62, for example, at 20 volts, to prevent damage to other components which may be connected to the alternator output. The varistor 62 operates to shunt the alternator coil until the alternator voltage passes through zero, turning off the SCRs, thus operating at most for a half cycle. Thereafter, since the SCRs are off, the alternator is open circuited, except for the tachometer circuit which has a high impedance. For example, resistor 70 can have a value of 56,000 ohms and resistor 78, 47,000 ohms. As noted, diode 52 is provided to raise the trigger threshold of transistor 38 and capacitor 50 is provided between the base and emitter of transistor 38 so that the transistor will not be turned on due to transient conditions. Also, as noted earlier, diode 64 is provided to protect the regulator circuitry should the operator accidentally connect the battery with reverse polarity.

When the battery voltage drops below that required to maintain Zener diode 68 on, bypass transistor 46 will turn off and trigger transistor 38 will again be biased on and the regulator circuit 10 will operate as previously described.

It is to be understood that the invention is not confined to the particular construction and arrangement of components herein illustrated and described, but embraces all such modified forms thereof as come within the scope of the following claims.

What is claimed is:

1. A magneto alternator regulator circuit for regulating charging of a battery by the output of the magneto alternator, said regulator circuit comprising first circuit means operative for connecting and disconnecting the battery in series with the alternator to allow or prevent charging of the battery, battery voltage sensing means coupled to said first circuit means for selectively rendering said first circuit means operative to disconnect the battery from being connected in series with the alternator to prevent charging of the battery, and tachometer output circuit means coupled to the magneto alternator and to said first circuit means, said tachometer output circuit means comprising a high impedance device and transistor switch means connected to the battery and to the alternator through said high impedance device for operating as an over-driven amplifier to provide a square wave output having a voltage magnitude substantially the same magnitude as the battery voltage.

2. A magneto alternator circuit in accordance with claim 1 wherein said first circuit means comprises rectifier means including thyristor switch means having a gate and operative when a trigger signal is applied to said gate for connecting the battery in series with the alternator to allow charging of the battery, trigger switch means which can be rendered conductive subject to said battery voltage sensing means, for applying said trigger signal to said gate, and shut-off switch means for rendering said trigger switch means conductive, and for connecting said transistor switch means to the battery.

3. A magneto alternator regulator circuit in accordance with claim 2, wherein said battery voltage sensing means comprises by-pass switch means, operative when the battery voltage exceeds an upper charging limit, for rendering said trigger switch means non-conductive to prevent application of said trigger signal to said gate of said thyristor switch means.

4. A magneto alternator regulator circuit in accordance with claim 3 wherein said rectifier means further comprises two diodes and wherein said thyristor switch means comprises two thyristors each having a gate, said diodes and thyristors being connected to the alternator and the battery to allow full wave charging of the battery by the alternator when trigger signals are applied to each of said thyristor gates, and wherein said trigger switch means is conductive, subject to said voltage sensing means, for applying trigger signals to each of said thyristor gates to allow said full wave charging of the battery.

5. A magneto alternator regulator circuit in accordance with claim 4 wherein the battery includes positive and negative terminals, wherein the alternator has opposite ends, wherein one of said two diodes has an anode connected to one end of the alternator and the other one of said diodes has an anode connected to the other end of said alternator, each of said diodes having a cathode connected to the positive terminal of the battery, and wherein one of said thyristors has a cathode connected to said one end of the alternator and the other of said thyristors has a cathode connected to said other end of the alternator, each of said thyristors having an anode connected to the negative terminal of the battery.

6. A magneto alternator regulator circuit in accordance with claim 5 wherein said voltage sensing means further comprises threshold voltage means coupled to said positive and negative terminals of the battery, said voltage threshold means being rendered conductive when the battery voltage exceeds said upper charging limit, and wherein said by-pass switch means comprises a by-pass transistor rendered conductive when said voltage threshold means is rendered conductive, said by-pass transistor when rendered conductive, rendering said trigger switch means non-conductive.

7. A magneto regulator in accordance with claim 5, further comprising voltage clamping means coupled across the positive and negative battery terminals to prevent the battery voltage or alternator voltage applied to the regulator circuit from exceeding an excess voltage limit.

8. A magneto alternator regulator circuit in accordance with claim 6, further comprising a diode connected in circuit with said battery and said voltage threshold means to prevent damage to said regulator circuit as a result of an operator connecting the battery in reverse polarity.

9. A magneto alternator regulator circuit in accordance with claim 6, wherein said shut-off switch means comprises a shut-off transistor which is rendered conductive when connected to the battery to enable said voltage sensing means and said first circuit means, and wherein said trigger switch comprises a trigger switch transistor rendered conductive by said shut-off transistor, subject to said by-pass transistor of said voltage sensing means.

10. A magneto regulator circuit for regulating charging of battery by the output of a magneto alternator, said regulator circuit comprising first circuit means operative for connecting and disconnecting the battery in series with the alternator to allow or prevent charging of the battery, said first circuit means comprising rectifier means including thyristor switch means having a gate and operative when a trigger signal is applied to said gate for connecting the battery in series with the alternator to allow charging of the battery, trigger switch means which can be rendered conductive, subject to the battery voltage, for applying said trigger signal to said gate, and shut-off switch means for rendering said trigger switch means conductive, battery voltage sensing means coupled to said first circuit means for selectively rendering said first circuit means operative to disconnect the battery from being connected in series with the alternator to prevent charging of the battery, said voltage sensing means comprising by-pass switch means, operative when the battery voltage exceeds an upper charging limit, for rendering said trigger switch means non-conductive to prevent application of said trigger signal to said gate of said thyristor switch means and tachometer output circuit means coupled to the magneto alternator and to said first circuit means, said tachometer output circit means comprising a high impedance device and transistor switch means connected to the battery through said shut-off means and connected to the alternator through said high impedance device for operating as an over-driven amplifier to provide a square wave output having a voltage magnitude substantially the same magnitude as the battery voltage.

11. A magneto regulator circuit in accordance with claim 10, wherein said rectifier means further comprises two diodes and wherein said thyristor switch means comprises two thyristors each having a gate, said diodes and thyristors being connected to the alternator and the battery to allow full wave charging of the battery by the alternator when trigger signals are applied to each of said thyristor gates, and wherein said trigger switch means is conductive, subject to said voltage sensing means, for applying trigger signals to each of said thyristor gates to allow said full wave charging of the battery.

12. A magneto alternator regulator circuit in accordance with claim 11 wherein the battery includes positive and negative terminals, wherein the alternator has opposite ends, wherein one of said two diodes has an anode connected to one end of the alternator and the other end of said diodes has an anode connected to the other one of said alternator, each of said diodes having a cathode connected to the positive terminal of the battery, and wherein one of said thyristors has a cathode connected to said one end of the alternator and the other said thyristors have a cathode connected to said other end of the alternator, each of said thyristors having an anode connected to the negative terminal of the battery.

* * * * *

UNITED STATES PATENT AND TRADEMARK OFFICE
CERTIFICATE OF CORRECTION

PATENT NO. : 4,439,721

DATED : March 27, 1984

INVENTOR(S) : Richard J. Mura

It is certified that error appears in the above-identified patent and that said Letters Patent are hereby corrected as shown below:

Column 3, line 33, "is" should be -- in --.

Column 8, line 12, "circit" should be -- circuit --.

Column 8, line 38, "one" should be -- end --.

Signed and Sealed this

Twentieth Day of August 1985

[SEAL]

Attest:

DONALD J. QUIGG

Attesting Officer *Acting Commissioner of Patents and Trademarks*